United States Patent
Li et al.

(10) Patent No.: US 11,163,940 B2
(45) Date of Patent: Nov. 2, 2021

(54) PIPELINE FOR IDENTIFYING SUPPLEMENTAL CONTENT ITEMS THAT ARE RELATED TO OBJECTS IN IMAGES

(71) Applicant: Microsoft Technology Licensing, LLC, Redmond, WA (US)

(72) Inventors: Qun Li, Lake Forest Park, WA (US); Changbo Hu, Fremont, CA (US); Keng-hao Chang, San Jose, CA (US); Ruofei Zhang, Mountain View, CA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 0 days.

(21) Appl. No.: 16/422,992

(22) Filed: May 25, 2019

(65) Prior Publication Data
US 2020/0372103 A1 Nov. 26, 2020

(51) Int. Cl.
*G06F 17/00* (2019.01)
*G06F 40/166* (2020.01)
*G06F 16/33* (2019.01)
*G06K 9/00* (2006.01)
*G06N 3/02* (2006.01)

(52) U.S. Cl.
CPC ........ *G06F 40/166* (2020.01); *G06F 16/3331* (2019.01); *G06K 9/00456* (2013.01); *G06N 3/02* (2013.01)

(58) Field of Classification Search
None
See application file for complete search history.

(56) References Cited

U.S. PATENT DOCUMENTS

| 10,269,034 | B2* | 4/2019 | Stergiou | G06Q 30/0241 |
| 10,521,691 | B2* | 12/2019 | Najibikohnehshahri | G06K 9/6289 |
| 10,621,474 | B2* | 4/2020 | Sharma | G06T 7/0012 |
| 10,650,188 | B2* | 5/2020 | Kasina | G06F 16/4393 |
| 2009/0006375 | A1* | 1/2009 | Lax | G06Q 30/02 |

(Continued)

OTHER PUBLICATIONS

Aneja et al., "Convolutional Image Captioning", date: 2018, pp. 5561-5570, URL: <https://ieeexplore.IEEE.org/stamp/stamp.jsp?tp=&arnumber=8578681&tag=1> (Year: 2018).*

(Continued)

*Primary Examiner* — Mustafa A Amin
(74) *Attorney, Agent, or Firm* — Medley, Behrens & Lewis, LLC

(57) ABSTRACT

Technologies are described herein that relate to identifying supplemental content items that are related to objects captured in images of webpages. A computing system receives an indication that a client computing device has a webpage displayed thereon that includes an image. The image is provided to a first DNN that is configured to identify a portion of the image that includes an object of a type from amongst a plurality of predefined types. Once the portion of the image is identified, the portion of the image is provided to a plurality of DNNs, with each of the DNNs configured to output a word or phrase that represents a value of a respective attribute of the object. A sequence of words or phrases output by the plurality of DNNs is provided to a search computing system, which identifies a supplemental content item based upon the sequence of words or phrases.

20 Claims, 10 Drawing Sheets

(56) References Cited

U.S. PATENT DOCUMENTS

| | | | |
|---|---|---|---|
| 2009/0024700 A1* | 1/2009 | Garg | G06Q 30/02 709/203 |
| 2009/0234716 A1* | 9/2009 | Mallick | G06F 3/0482 705/14.54 |
| 2010/0145808 A1* | 6/2010 | Hilbert | G06Q 30/02 705/14.66 |
| 2015/0178786 A1* | 6/2015 | Claessens | G06Q 30/0269 705/14.66 |
| 2015/0294358 A1* | 10/2015 | Galadari | G06Q 30/0257 705/14.55 |
| 2017/0270353 A1* | 9/2017 | Yamaji | G06K 9/00362 |
| 2018/0204111 A1 | 7/2018 | Zadeh et al. | |
| 2018/0260417 A1* | 9/2018 | Mahadevan | G06F 16/5866 |
| 2018/0349447 A1* | 12/2018 | Maccartney | G06F 16/9535 |
| 2019/0043095 A1* | 2/2019 | Grimaud | G06F 16/906 |
| 2019/0095535 A1* | 3/2019 | Miller | G06F 16/9535 |
| 2019/0180097 A1* | 6/2019 | Ferguson | G06K 9/6267 |
| 2020/0050846 A1* | 2/2020 | Sharma | G06K 9/00456 |

OTHER PUBLICATIONS

"International Search Report and Written Opinion Issued in PCT Application No. PCT/US20/024538", dated Jul. 21, 2020, 13 Pages.

* cited by examiner

PIPELINE FOR IDENTIFYING SUPPLEMENTAL CONTENT ITEMS THAT ARE RELATED TO OBJECTS IN IMAGES

BACKGROUND

Supplemental content items are often provided on webpages to generate revenue for publishers of the webpages. For example, a company may pay a publisher to display a supplemental content item on a webpage, wherein the webpage is published by the publisher, and further wherein the supplemental content item describes a product or service of the company that is available for acquisition.

Typically, a company desires to have a supplemental content item shown on a webpage where content of the webpage is related to the content of the supplemental content item. For example, a company that sells electronics may wish to have a supplemental content item (that includes information about a television that is available for purchase from the company) be displayed on a webpage that includes information about television shows.

Webpages may include images, wherein the images capture objects. With respect to an exemplary webpage that includes an image, text accompanying the image on the webpage may not be descriptive of the contents of the image. For instance, the webpage may include an image of a person wearing a hat, and text accompanying the image may reference the person. The text accompanying the image, however, is silent as to the hat being worn by the person in the image. Hence, even though a company may wish to present a supplemental content item related to the hat, conventionally there is no suitable computer-implemented approach for automatically identifying a supplemental content item to display with the image on the webpage.

SUMMARY

The following is a brief summary of subject matter that is described in greater detail herein. This summary is not intended to be limiting as to the scope of the claims.

Described herein are various technologies pertaining to identifying supplemental content items for presentment on webpages based upon images that are included in the webpages. An interface module on a client computing device detects that the client computing device has loaded a webpage, and responsive to detecting that the client computing device has loaded the webpage, transmits an identifier of the webpage (e.g., a URL) to a computing system. The computing system receives the identifier of the webpage from the client computing device and retrieves text of the webpage based upon the identifier of the webpage. In addition, the computing system further ascertains that the webpage includes an image responsive to receiving the identifier of the webpage. The computing system can parse the text of the webpage to ascertain whether a supplemental content item is to be included on the webpage while the webpage is being viewed at the client computing device. For example, a company may not wish to have a supplemental content item corresponding thereto shown on a webpage when text of the webpage discusses a controversial topic, when the sentiment of text in the webpage is negative, when the text in the webpage includes one or more "stop" words or phrases (such as profanity and/or other words or phrases associated with controversy), etc. When the computing system determines that a supplemental content item is not to be presented on the webpage, the computing system ceases processing of the webpage.

When the computing system determines that it is appropriate to include a supplemental content item on the webpage, the computing system retrieves the image in the webpage. For example, the interface module, upon detecting that the client computing device has loaded the webpage, can transmit a uniform resource locator (URL) for the image to the computing system, which then retrieves such image based upon the URL. In an exemplary embodiment, once the computing system has retrieved the image, the computing system can provide the image as input to a first deep neural network (DNN) that is configured to identify objects of predefined types in images. In a nonlimiting example, the first DNN can be configured to identify articles of clothing in images, such as shirts, pants, hats, scarves, shoes, etc. In another example, the first DNN can be configured to identify pieces of furniture in images, such as sofas, beds, armoires, tables, chairs, etc. In addition, the first DNN is configured to define bounding boxes that approximately correspond to boundaries of identified objects in the images, wherein portions of the images can be extracted based upon the identified bounding boxes (e.g., such that a portion of an image extracted from the image includes an identified object isolated from other objects captured in the image). Thus, in an example, when the image provided to the first DNN includes a person wearing a shirt, the first DNN can identify the shirt and form a bounding box around the shirt. The portion of the image defined by the bounding box is extracted from the image.

Responsive to the computing system extracting the portion of the image that includes the object from the image, the computing system is configured to generate text that is descriptive of the object based upon the portion of the image. In an exemplary embodiment, the portion of the image is provided to a plurality of DNNs, with each of the DNNs configured to output a word or phrase that is representative of a value of a respective attribute of the object. In an example, the plurality of DNNs can include a second DNN, a third DNN, and a fourth DNN. The second DNN is configured to receive the portion of the image and output a word or phrase that represents a value of a first attribute of the object, the third DNN is configured to receive the portion of the image and output a word or phrase that represents a value of a second attribute of the object, and the fourth DNN is configured to receive the portion of the image and output a word or phrase that represents a value of a third attribute of the object.

Pursuant to an example, the object can be a black shirt for a man, the first attribute can be "gender/age", the second attribute can be "color", and the third attribute can be "type". Thus, the second DNN can output the word "men's", the third DNN can output the word "black", and the fourth DNN can output the word "shirt". Other exemplary attributes will be readily contemplated.

Once the plurality of DNNs have output the words or phrases that represent values of attributes of the object captured in the portion of the image, the output words or phrases can be arranged in a semantically correct sequence. For example, the word output by the second DNN and may be placed first in the sequence, the word output by the third DNN and can be placed second in the sequence, and the word output by the fourth DNN can be placed third in the sequence. The computing system can then transmit the sequence of words and/or phrases to a search system, whereupon the search system identifies one or multiple supplemental content items based upon the sequence of words and/or phrases. The search system can cause the supplemental content item to be transmitted to the client computing device, and the interface module can then cause the supplemental content item to be presented on the webpage of the client computing device together with the image. In another example, the interface module can cause a selectable graphical icon to be presented on the webpage, wherein when the selectable graphical icon is selected, the supplemental content item identified by the search system is presented on the webpage. Hence, unlike conventional approaches that usually involve human labelers' manual annotation, the technologies described herein enable supplemental content items that are related to an object captured an image to be identified automatically, even when text corresponding to such image fails to be descriptive of the object in the image.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
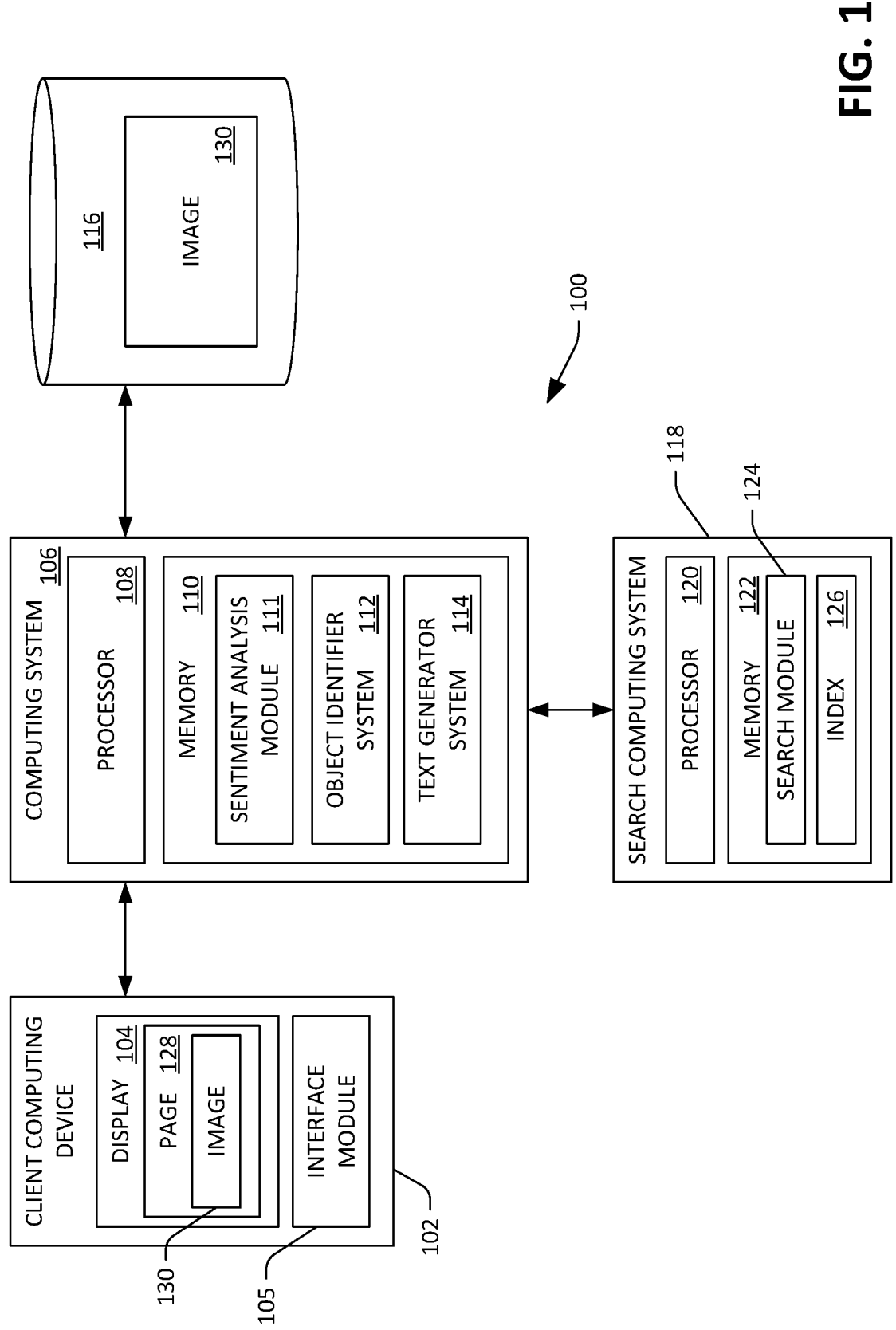
FIG. 1 is a functional block diagram of an exemplary system that facilitates identifying a supplemental content item that is related to an object captured in an image.

Various technologies pertaining to causing a supplemental content item that is related to an image in a webpage to be presented on the webpage when viewed at a client computing device are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "system", and "module" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Described herein are various technologies that facilitate identifying a supplemental content item that is related to an object in an image. With more particularity, a processing pipeline for presenting a supplemental content item on a web page is described herein. Initially, an image on a webpage being viewed at a client computing device is identified, and a determination is made that the image includes an object of a type from amongst a plurality of predefined types. A portion of the image that includes the object is extracted from the image, and text that is descriptive of the object is generated based upon the portion of the image. A supplemental content item that is related to the object captured in the image is identified based upon the generated text. Responsive to the supplemental content item being identified, the supplemental content item can be caused to be displayed on the webpage being viewed at the client computing device.

With reference now to FIG. 1, a functional block diagram of an exemplary system 100 is illustrated, wherein the system 100 facilitates identifying a supplemental content item that is related to an object in an image. The system 100 comprises a client computing device 102, which can be any suitable type client computing device, including but not limited to a desktop computing device, a laptop computing device, a tablet computing device, a video game console, a mobile telephone, a wearable computing device, etc. The client computing device 102 includes or is in communication with a display 104. Additionally, the client computing device 102 has an interface module 105 executing thereon, that is configured to interface the client computing device 102 with other computing systems. The interface module 105 is described in greater detail below.

The system 100 additionally includes a computing system 106 that is in network communication with the client computing device 102 via the interface module 105, wherein the computing system 106 is configured to generate text that is descriptive of objects in images. The computing system 106 includes a processor 108 and memory 110 that comprises instructions that are executed by the processor 108. With more specificity, the memory 110 comprises a sentiment analysis module 111 that is configured to determine whether it is appropriate to display supplemental content on a webpage. The memory 110 additionally comprises an object identifier system 112 that is configured to identify existence of objects of predefined types in images. The object identifier system 112 is further configured to define bounding boxes in the images that correspond to boundaries of the objects in the images. The object identifier system 112 is additionally configured to extract portions of the images from the images, wherein the portions extracted by the images are the portions that include the objects. In an example, the object identifier system 112 can include a deep neural network (DNN) that is trained to identify objects of predefined types in images and is further trained to define bounding boxes that correspond to boundaries of such objects in the images. In a nonlimiting example, the DNN of the object identifier system 112 can be configured to identify objects of 100 or more types (e.g., the DNN can include at least 100 output nodes). The DNN can be trained using labeled training data, wherein the late labeled training data includes images that have bounding boxes that encompass the images, and further wherein labels are assigned to the bounding boxes that indicate types of objects included within the bounding boxes. The training data may also optionally comprise images included in electronic advertisements, wherein such electronic advertisements include labels that identify types of objects in the images.

The memory 110 further includes a text generator system 114 that is configured to receive the portions of the images output by the object identifier system 112, and is further configured to generate text that is descriptive of objects included in the portions of the images. Pursuant to an example, the text generator system 114 includes a plurality of DNNs, wherein each DNN in the plurality of DNNs is configured to output a word or phrase that is representative of a value of a respective attribute of the objects. For instance, the text generator system 114 can include a first DNN that, upon receipt of a portion of an image that includes an object, is configured to output a word or phrase that is representative of color of the object. In another example, the text generator system 114 can include a second DNN that, upon receipt of the portion of the image, is configured to output a word or phrase that is representative of a gender (and age range) associated with the object. In still yet another example, the text generator system 114 may include a third DNN that, upon receipt of the portion of the image, is configured to output a word or phrase that is representative of a type (name) of the object. It can be ascertained that a number of DNNs in the text generator system 114 and attributes for which the DNNs are trained is dependent upon the types of objects for which the object identifier system 112 is trained to identify. For instance, when the object identifier system 112 is trained to identify articles of clothing, the text generator system 114 can include DNNs that are configured to output words or phrases that represent respective attributes "color", "gender", and "name". In another example, when the object identifier system 112 is trained to identify pieces of furniture, the text generator system 114 can include DNNs that are configured to output words or phrases that represent respective attributes "material", "color", and "name".

The system 100 additionally includes a data store 116 that is in network communication with the computing system 106. The data store 116 can include images, metadata such as detected bounding boxes, generated words, sentiment analysis result, and the computing system 106 can retrieve one or more of the data types from the data store 116. While illustrated as being separate from the computing system 106, it is to be understood that the computing system 106 can include all or part of the data store 116.

The system 100 also comprises a search computing system 118, wherein the search computing system 118 is in network communication with the computing system 106. The search computing system 118 is configured to receive text that is generated by the text generator system 114 and is further configured to search for supplemental content items based upon the received text. The search computing system 118 includes a processor 120 and memory 122, wherein the memory 122 includes a search module 124. The memory 122 also includes a supplemental content item index 126 that can be searched by the search module 124. The search module 124 receives text that is descriptive of an object (generated by the text generator system 114) and searches the supplemental content item index 126 for a supplemental content item that is related to the object based upon the text. The search computing system 118 is in network communication with the computing system 106, wherein the computing system 106 receives supplemental content items from the search system 118. The computing system 106 can transmit a supplemental content item that is related to an object to the client computing device 102, whereupon the client computing device 102 can display the supplemental content item to a user.

Exemplary operation of the system 100 is now set forth. In an exemplary embodiment, a user of the client computing device 102 causes a web browser executing thereon to load a page 128 (wherein the web page has a URL assigned thereto). Upon the web browser loading the page 128, the page 128 is presented on the display 104 of the client computing device 102. The page 128 includes an image 130, wherein the image 130 can be a static image or a frame of a video.

Figure 2:
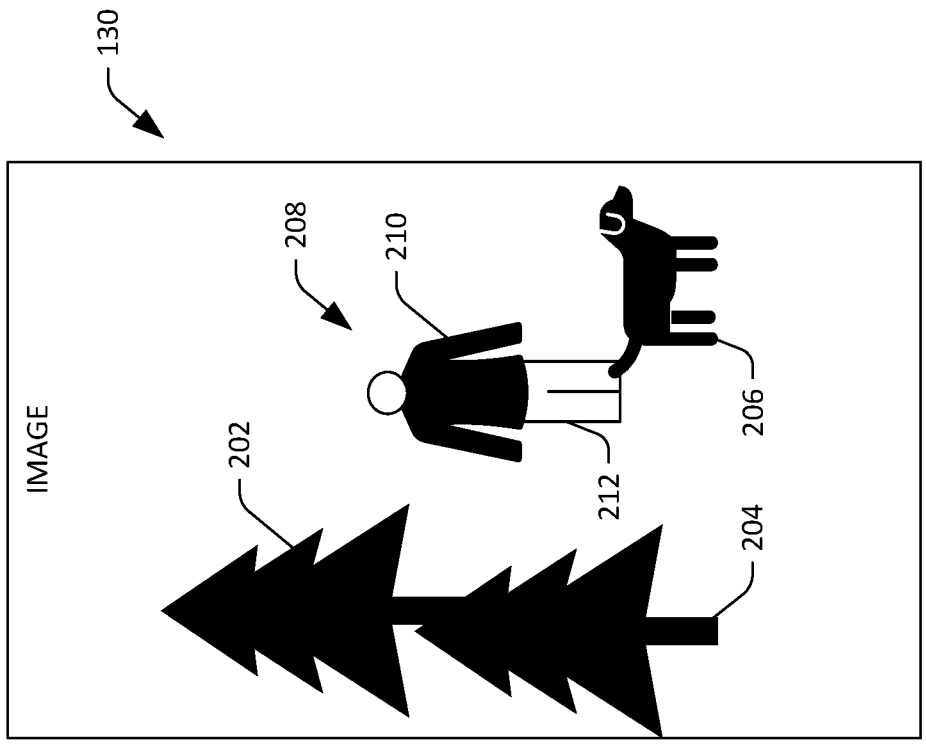
FIG. 2 illustrates an exemplary image that includes several objects.

Referring briefly to FIG. 2, an exemplary depiction of the image 130 is presented. The image 130 includes several objects. Specifically, the image 130 includes trees 202 and 204, a dog 206, a person 208, a shirt 210 being worn by the person 208, and pants 212 being worn by the person 208.

Returning to FIG. 1, the page 128 can also include or refer to the interface module 105. In an exemplary embodiment, the interface module 105 can be or include a script that is placed in the web page. The interface module 105, when executed by the web browser, causes the client computing device 102 to communicate with the computing system 106 (e.g., send data to the computing system 106 and receive data from the computing system 106). More specifically, the interface module 105, when executed by the web browser, causes the client computing device 102 to transmit an indication to the computing system 106 that the page 128 is being presented on the display 104 of the client computing device 102. This indication can, for example, include a URL of the page 128, a URL of the image 130 on the page 128, the image 130 itself, text of the page 128, and/or the like.

Upon the computing system 106 receiving the indication that the page 128 is being viewed at the client computing device 102, the sentiment analysis module 111 can parse text of the page to ascertain sentiment of the page 128 and/or to ascertain whether any words on a blacklist are included in the text on the page 128. For example, when the sentiment analysis module 111 determines that sentiment of the page is highly negative, the sentiment analysis module can output an indication that a supplemental content item is not to be displayed on the page 128. In another example, when the sentiment analysis module 111 determines that text of the page 128 includes one or more words or phrases in a blacklist (such as profanity or words and/or phrases associated with controversial topics), the sentiment analysis module 111 can output an indication that a supplemental content item is not to be displayed on the page 128. When the sentiment analysis module 111 determines that the sentiment of the page 128 is not highly negative and/or when the sentiment analysis module 111 determines that the text of the page 128 fails to include one or more words on the blacklist, then the computing system 106 can perform actions that facilitate identifying a supplemental content item that is to be displayed on the page 128.

In an exemplary embodiment, the indication received from the client computing device 102 that the page 128 is being displayed on the display 104 can include a URL of the image 130. In response to receiving the indication from the client computing device 102, the computing system 106 can retrieve the image 130 from the data store 116 based upon the URL of the image 130. The computing system 106 provides the image 130 as input to the object identifier system 112, wherein the object identifier system 112 identifies one or more objects in the image 130, wherein the objects are of a type from amongst a plurality of predefined types that the object identifier system 112 is trained to identify. In addition, the object identifier system 112 can define bounding boxes that correspond to boundaries of the identified objects in the image 130 and can extract portions of the image 130 defined by the bounding boxes from the image 130. Hence, the object identifier system 112 extracts a portion of the image 130 that isolates an identified object from other objects in the image 130.

Figure 3:
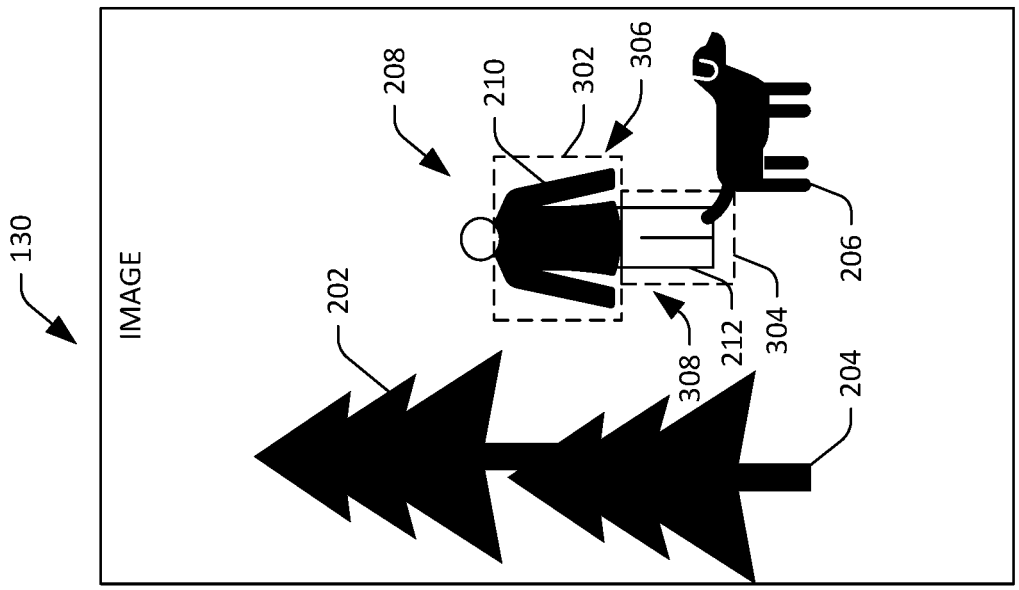
FIG. 3 illustrates a bounding box around an object captured in the exemplary image.

Referring briefly to FIG. 3, the image 130 is provided as input to the object identifier system 112, wherein (in this example) the DNN of the object identifier system 112 is configured to identify articles of clothing in images. In the exemplary image 130, two articles of clothing are captured: 1) the shirt 210; and 2) the pants 212 being worn by the person 208. In addition, the object identifier system 112 can define a first bounding box 302 that includes the shirt 210 (but not the pants 212) and can further identify a second bounding box 304 that includes the pants 212 (but not the shirt 210). The object identifier system 112 can extract two portions 306 and 308 of the image 130 that respectively correspond to the bounding boxes 302 and 304 and can provide such portions 306 and 308 to the text generator system 114. For purposes of explanation, provision of the portion 306 of the image 130 to the text generator system 114 is described; it is to be understood, however, that the text generator system 114 performs similar actions with respect to the portion 308 of the image 130.

Figure 4:
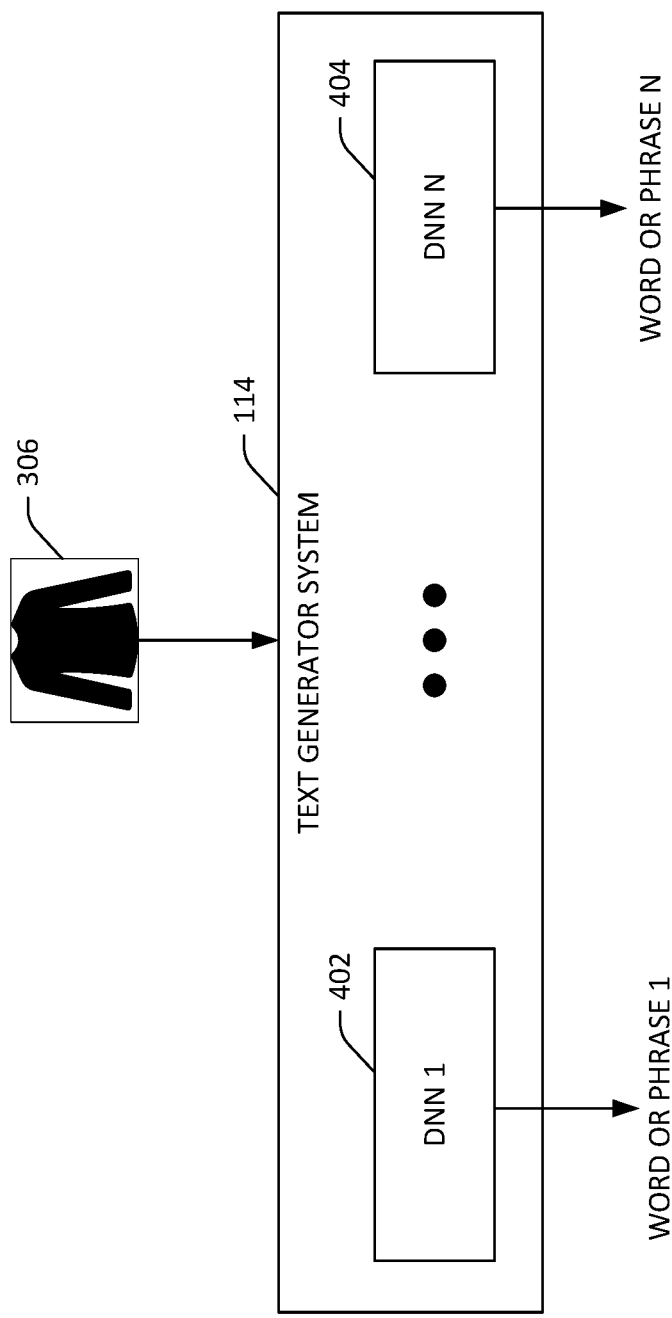
FIG. 4 is a functional block diagram of an exemplary text generator system that is configured to generate text that is descriptive of an object captured in an image.

Returning to FIG. 1, the text generator system 114 receives the portion 306 of the image 130 defined by the bounding box 302 that is output by the object identifier system 112. Turning to FIG. 4, a functional block diagram of the text generator system 114 is illustrated. The text generator system 114 includes a plurality of DNNs 402-404, wherein each of the DNNs 402-404 is configured to output a word or phrase that is representative of an attribute of an object included in the portion 306 of the image 130. In an example, the plurality of DNNs 402-404 can include a first DNN 402, a second DNN, and a third DNN. The first DNN 402, upon receipt of a portion of an image that includes an object, is configured to output a value that represents the attribute "color" of the object; the second DNN, upon receipt of the portion of the image, is configured to output a value that represents the attribute "gender and age" of the object, and the third DNN, upon receipt of the portion of the image, is configured to output a value that represents the attribute "type" of the object.

Thus, the portion 306 of the image 130 is provided to the first DNN 402, and the first DNN 402 is configured to output a word or phrase that represents the color of the shirt 210 (e.g., "black"). The portion 306 of the image 130 is also provided to the second DNN, and the second DNN is configured to output a word or phrase that represents a gender/age associated with the shirt 210 (e.g., "men's"). The portion 306 of the image 130 is further provided to the third DNN, and the third DNN is configured to output a word or phrase that represents the type of the article of clothing (e.g., "shirt"). The DNNs 402-404 can be executed in parallel. In another example, an input to one DNN can be based upon output of another DNN.

The text generator system 114 can then be configured to arrange the words and/or phrases in a sequence that is semantically and syntactically correct. Thus, the text generator system 114 can position the word output by the second DNN first in the sequence, can position the word output by the first DNN 402 second in the sequence, and can position the word output by the third DNN third in the sequence. Thus, the text generator system 114 can output the phrase "men's black shirt."

It is to be understood that the text generator system 114 can include any suitable number of DNNs that are trained to output words and/or phrases that represent values of attributes, wherein the number of DNNs in the text generator system 114 may be a function of the types of objects identified by the object identifier system 112. Further, the DNNs of the text generator system 114 are trained based upon labeled training data, wherein the labeled training data can be acquired through crowdsourcing efforts, from electronic advertisements, etc. For example, conventional electronic advertisements include an image of an object and a description of the object captured in the image. Hence, the images in electronic advertisements and their labels can be used to train one or more of the DNNs of the text generator system 114.

Returning again to FIG. 1, responsive to the text generator system 114 outputting the sequence of words and/or phrases that is descriptive of the shirt 210 included in the portion 306 of the image 130, the computing system 106 can transmit the sequence of words and/or phrases (hereinafter referred to as text) to the search computing system 118. The search module 124 receives the text and searches over the supplemental content item index 126 based upon the text. Therefore, the search module 124 executes a search over the supplemental content item index 126 using the query "men's black shirt". Responsive to identifying a supplemental content item, the search module 124 transmits the supplemental content item (or a URL that points to the supplemental content item) to the computing system 106, which in turn transmits the supplemental content item (or the URL that points to the supplemental content item) to the client computing device 102 (e.g., to the interface module 105). The interface module 105 can then cause the supplemental content item to be presented on the page 128 in correlation with the image 130. In another example, the interface module 105, upon receiving the supplemental content item, can cause a graphical icon to be presented on the page 128, whereupon the supplemental content item identified by the search module 124 is presented on the page 128 in response to a user of the client computing device 102 selecting the selectable graphical icon. The supplemental content item can be any suitable electronic item which can include, but is not limited to, including an image, a video text, etc. Pursuant to a specific example, the supplemental content item is an electronic advertisement, wherein upon the electronic advertisement being selected the client computing device 102 is configured to load a page where a product or service advertised by the electronic advertisement can be purchased. In this example, the supplemental content item may be an electronic advertisement for a men's black shirt that is available for purchase from a company.

From the foregoing can be ascertained that the client computing device 102, the computing system 106, and the search system 118 can operate in conjunction in connection with identifying supplemental content items that are related to objects in images being viewed on web pages of the client computing device 102. In contrast to conventional approaches, the identification of such supplemental content items is not reliant upon labels manually assigned to images in pages by human labelers and/or text that accompanies such images. Referring again to the exemplary image depicted in FIG. 2, the image 130 may be of a scenic landscape and text corresponding to such image on the page 128 may describe an identity of the person 208, an identity of a location where the image 130 was captured, etc. The text accompanying the image 130 on the page 128, however, may not refer to the shirt 210 being worn by the person 208. Nevertheless, the object identifier system 112 can identify that the image 130 includes the shirt 210, and the text generator system 114 can generate text that is descriptive of the shirt 210. The search computing system 118 can then identify a supplemental content item that is related to the shirt 210 despite the text of the page 128 not referring to the shirt 210.

Figure 5:
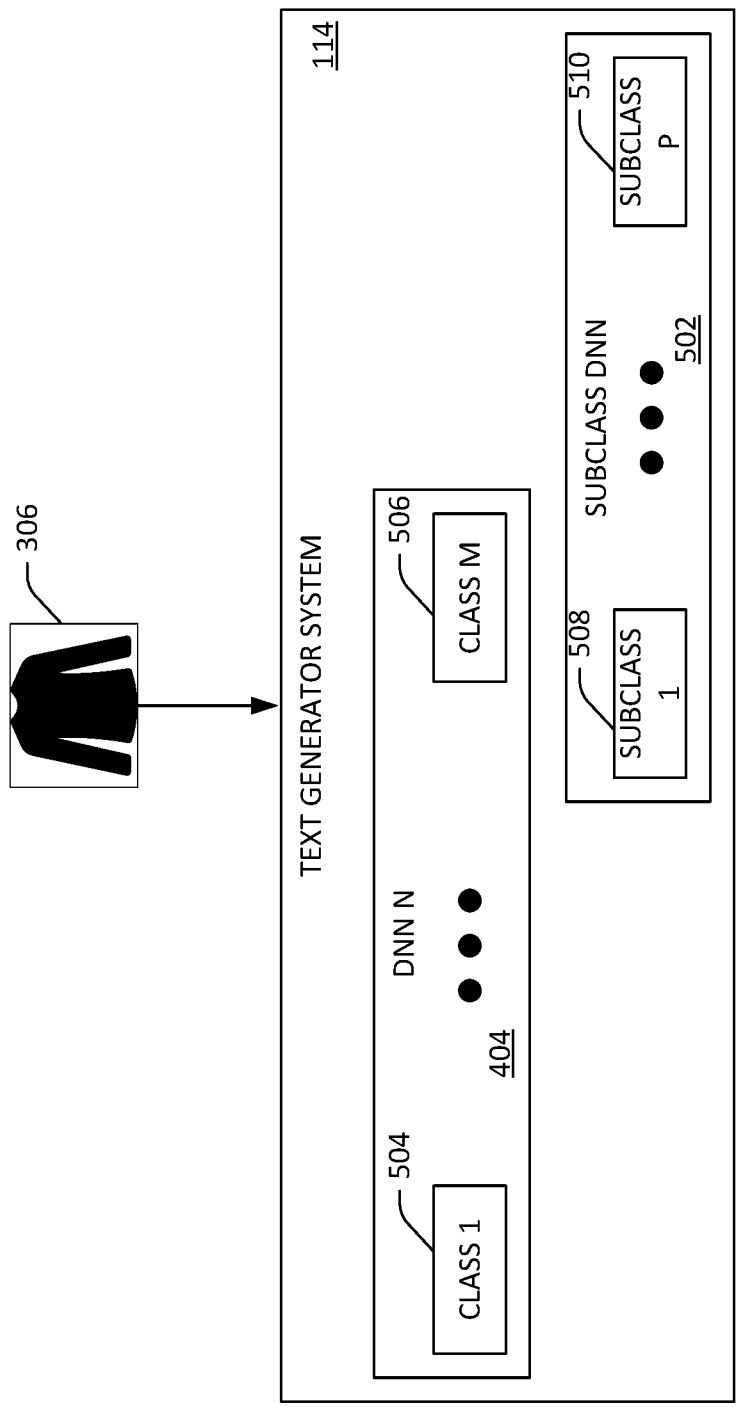
FIG. 5 is a functional block diagram of an exemplary text generator system that includes a hierarchical arrangement of deep neural networks.

With reference now to FIG. 5, another exemplary functional block diagram of at least part of the text generator system 114 is illustrated. The text generator system 114 includes the Nth DNN 404 and a subclass DNN 502, wherein the Nth DNN 404 and the subclass DNN 502 are arranged hierarchically. In this example, the Nth DNN 404 can be configured to output words and/or phrases that represent the attribute "type" for an article of clothing. To that end, the Nth DNN 404 can include a plurality of output nodes 504-506 that represent clothing classes; hence, the first output node 504 can represent the class "shirt", a second output node can represent the class "pants", a third output node can represent the class "shoes", and so forth. When training the Nth DNN 404, an amount of training data across all desired classes may be unbalanced. For example, a desired output class may be "scarf"; there may, however, be relatively few training examples that includes scarves. In contrast, there may be a very large number of training examples that include shirts and a very large number of training examples that include pants. Hence, the amount of training data across the classes "shirt", "pants", and "scarf" may be unbalanced.

To account for unbalanced amounts of training examples across desired classes, it is contemplated that an output node in the Nth DNN 404 can represent a class that is a superset of subclasses for such class. Therefore, for example, the Mth node 506 can represent a class that encompasses several subclasses, such as "scarf", "hat", "earmuff", and "sunglasses". The number of subclasses that the Mth node 506 in the Nth DNN 404 represents can be a function of the volume of training data across classes. Put differently, the volume of training data for the class represented by the Mth node 506 can be approximately equivalent to the volume of training data for the first class represented by the first node 504.

As noted above, the subclass DNN 502 is arranged hierarchically with the Nth DNN 404. The subclass DNN 502 includes nodes 508-510 that represent subclasses of the class represented by the Mth node 506 of the Nth DNN 404. Continuing with the example set forth above, a first output node 508 represents the subclass "scarf", a second output node represents the subclass "hat", a third output node represents the subclass "earmuff", and a fourth output node represents the subclass "sunglasses".

As the Nth DNN 404 is a probabilistic model, when it is ascertained that the object in the portion 306 of the image belongs to the class represented by the Mth node 506 of the Nth DNN 404 (e.g., when a probability corresponding to the Mth node 506 is highest from amongst all probabilities of the output nodes 504-506), the portion 306 of the image can be provided to the subclass DNN 502. The text generator system 114 can output a word and/or phrase based upon output of the subclass DNN 502.

Figure 6:
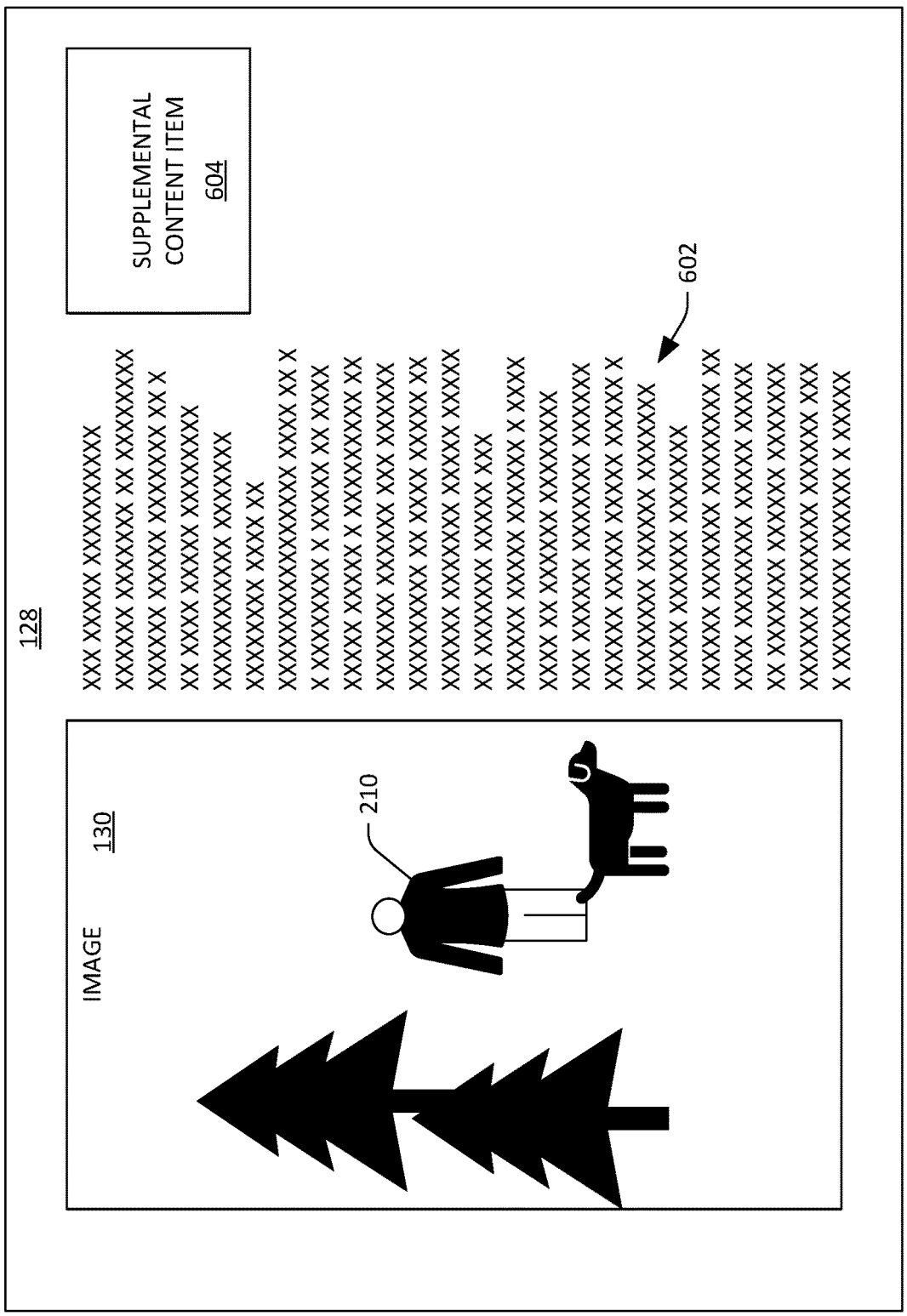
FIG. 6 depicts an exemplary webpage with an image included therein, wherein a supplemental content item is displayed on the webpage.

Referring now to FIG. 6, an exemplary depiction of the page 128 is presented. The page 128 includes the image 130 and a region of text 602 that corresponds to the image 130. In the example shown in FIG. 6, the page 128 also includes a supplemental content item 604 identified by the search module 124 as being related to an object in the image 130. For instance, the supplemental content item 604 may be an electronic advertisement that is related to the 210 captured in the image 130. The supplemental content item 604 can be or include a hyperlink, where upon a user selecting the hyperlink, a webpage related to the object captured in the image can be loaded by a web browser executing on the client computing device 102.

Figure 7:
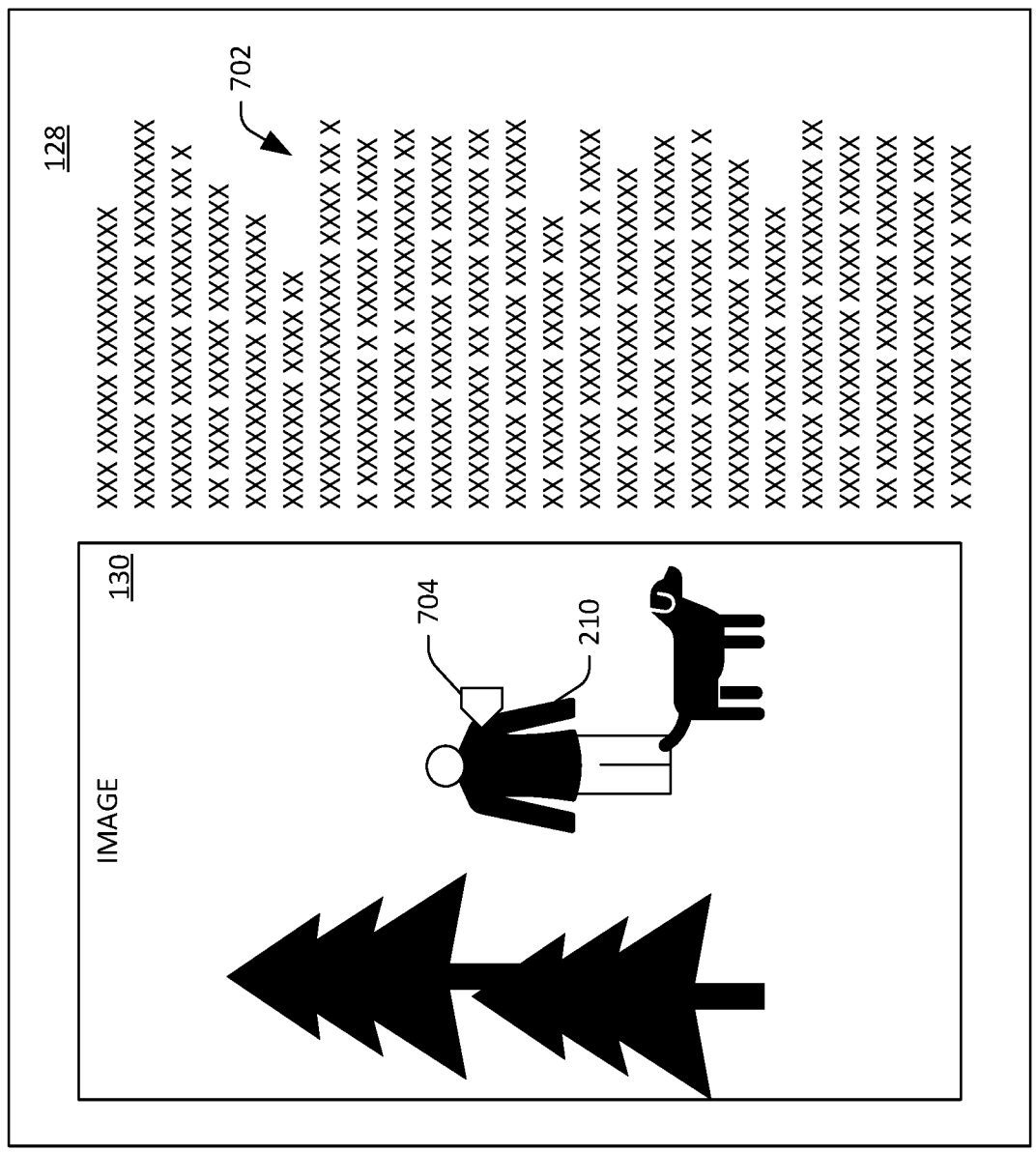
FIG. 7 depicts a webpage that comprises an image, wherein a selectable graphical icon is presented on the image to indicate that a supplemental content item is available with respect to an object captured in the image.

Referring now to FIG. 7, another exemplary depiction of the page 128 is illustrated. The page 128 includes the image 130 and a region 702 that comprises text. When the search module 124 ascertains that the supplemental content item relates to the shirt 210 in the image 130, the search module 124 can transmit the supplemental content item (or the URL that points to such item) to the computing system 106, which transmits the supplemental content item or the URL to the interface module 105 executing on the client computing device 102. The interface module 105 can cause the client computing device 102 to present a selectable graphical icon 704 on the image 130 (e.g., on or proximate the shirt 210). Upon a user selecting the selectable graphical icon 704, the interface module 105 can cause one or more supplemental content items that are related to the object (shirt 212) in the image 130 to be presented on the page 128.

Figure 8:
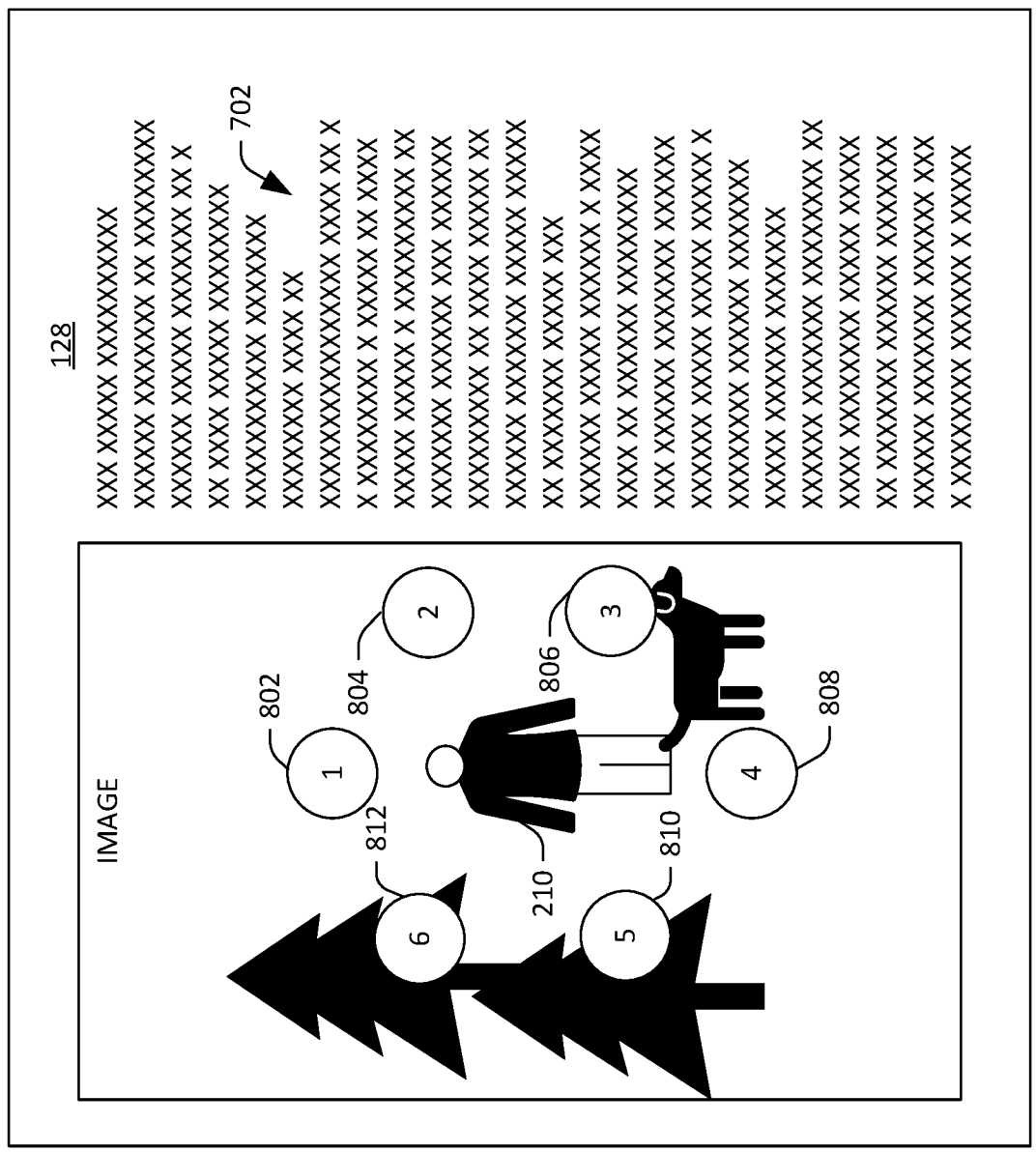
FIG. 8 depicts a webpage that includes supplemental content items displayed on an image.

Turning now to FIG. 8, another depiction of the page 128 is illustrated. Upon the graphical icon 704 being selected by a user of the client computing device 102, the interface module 105 can cause a plurality of supplemental content items 802-812 to be presented on the page 128 (e.g. overlaid upon the image 130). In an example, each of the supplemental content items 802-812 may be selectable and may direct the user to respective pages that correspond to the object (shirt) captured in the image 130.

Figure 9:
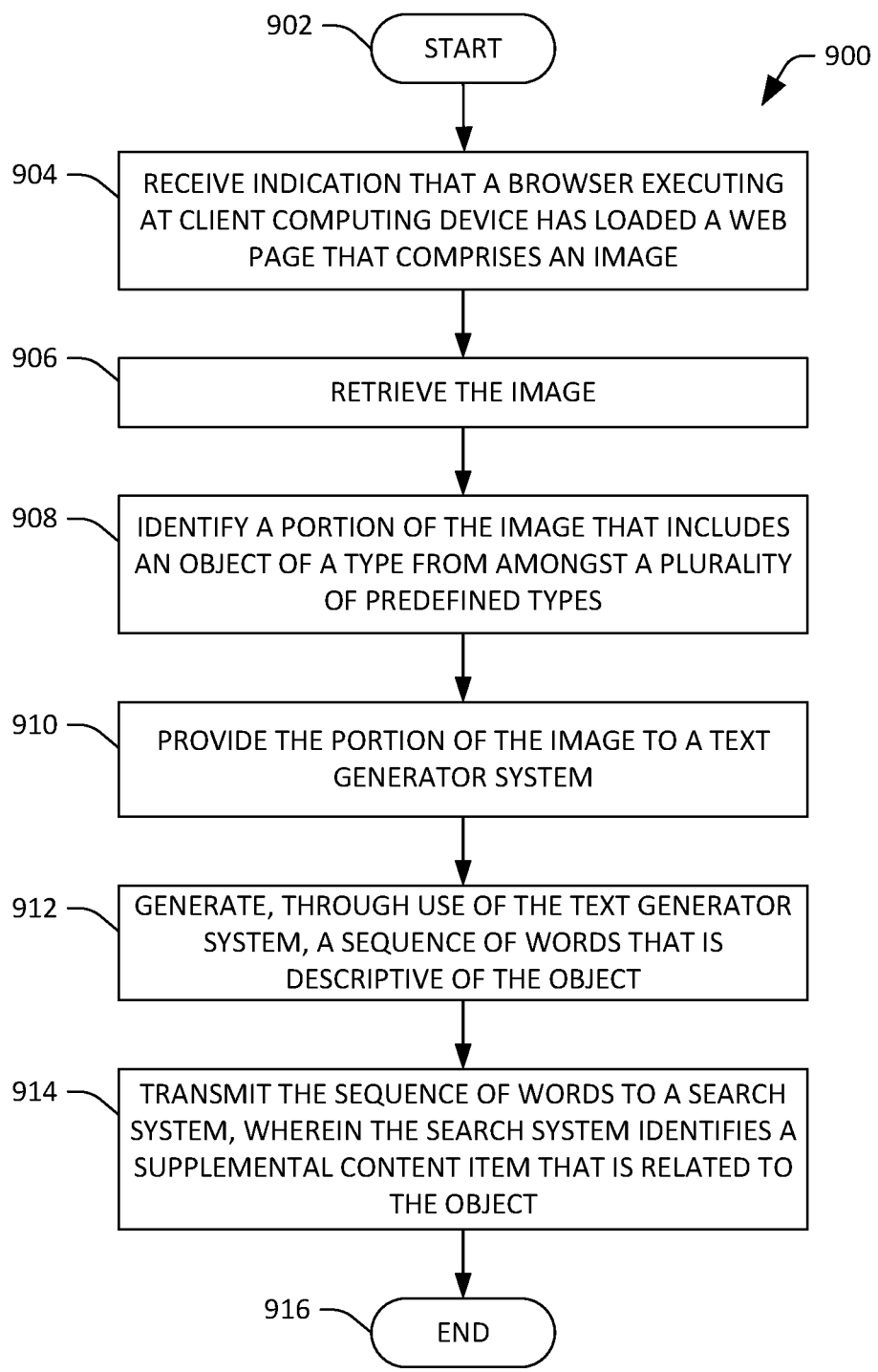
FIG. 9 is a flow diagram that illustrates an exemplary methodology for generating text that is descriptive of an object captured in an image, wherein the image is included in a webpage being viewed at a client computing device.
Figure 10:
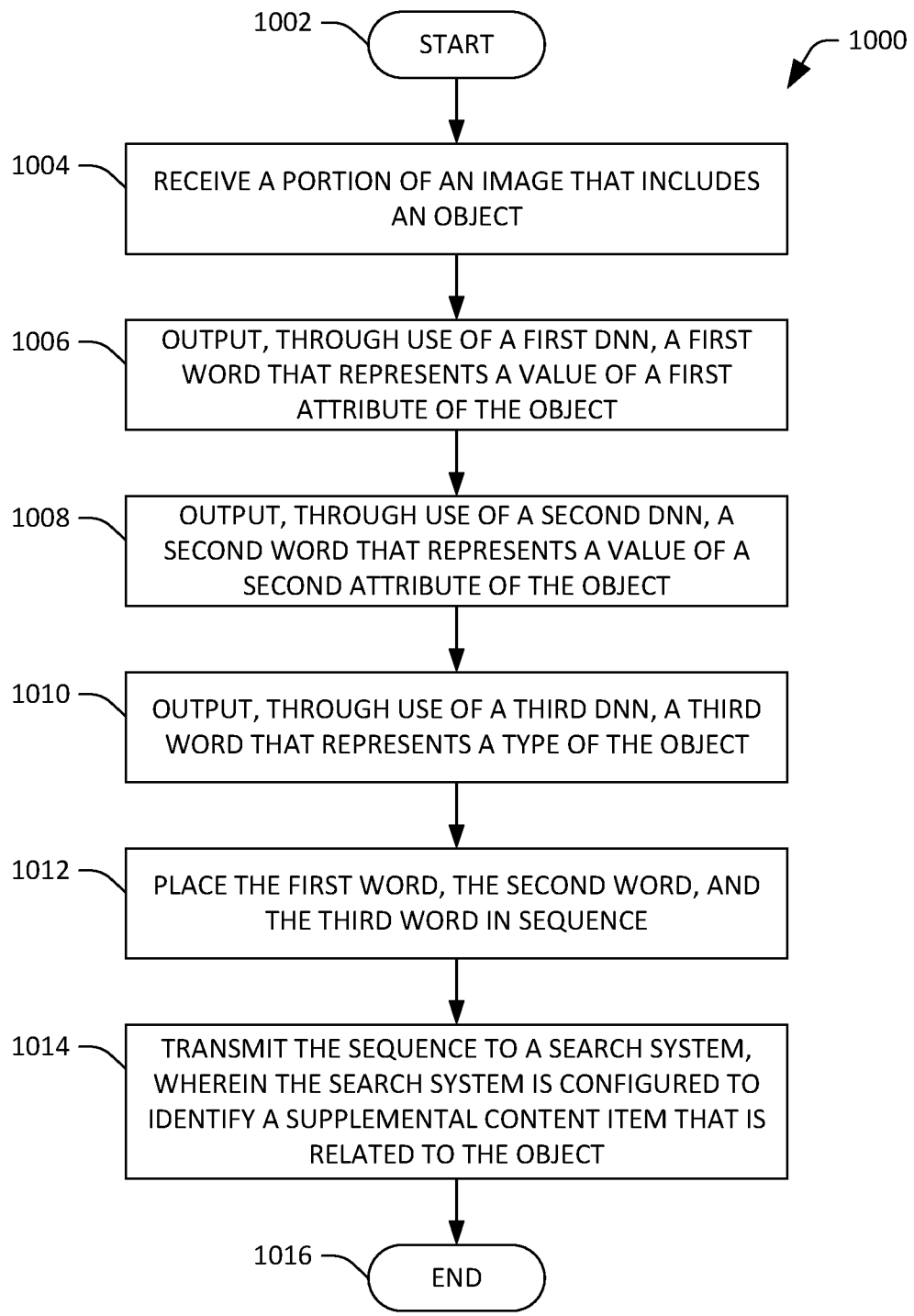
FIG. 10 is a flow diagram illustrating an exemplary methodology for outputting words that are representative of values of attributes of an object captured in an image that is included in a webpage.

FIGS. 9 and 10 illustrate exemplary methodologies relating to identifying supplemental content items that are related to objects captured in images on webpages. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Turning now to FIG. 9, a flow diagram illustrating an exemplary methodology 900 that facilitates identifying a supplemental content item based upon an image is illustrated. In an example, the methodology can be performed by the computing system 106. The methodology 900 starts at 902, and at 904 an indication is received that a web browser executing on a client computing device has loaded a webpage, wherein the webpage comprises an image. For instance, the webpage may have a script therein, wherein the script is executable by the client computing device. When the client computing device executes the script, the client computing device transmits a message to the computing system 106, wherein the message includes, for example, a URL of the webpage and/or a URL of the image.

At 906, the image is retrieved (through use of the URL of the image) responsive to receipt of the indication received at 904. At 908, a portion of the image is identified that includes an object, wherein the object is of a type from amongst a plurality of predefined types. For instance, the image can be provided to a DNN that includes several output nodes, with output nodes corresponding to types of objects. An output of such DNN can be a probability distribution over object types.

At 910, the portion of the image that includes the object is provided to a text generator system. The text generator system can include a plurality of DNNs, wherein each DNN is configured to receive the portion of the image and output a value that represents a value of a respective attribute of the object that is included in the portion of the image.

At 912, a sequence of words that is descriptive of the object is generated through use of the text generator system. At 914, the sequence of words is transmitted to a search system, wherein the search system identifies a supplemental content item that is related to the object based upon the sequence of words. The supplemental content item is then caused to be displayed on the client computing device that has loaded the webpage, such that the supplemental content item can be displayed in conjunction with the image that includes the object. The methodology 900 completes at 916.

Referring now to FIG. 10, a flow diagram illustrating an exemplary methodology 1000 that facilitates identifying a supplemental content item that is related to an object in an image being presented on a display of a client computing device is illustrated. The methodology 1000 starts at 1002, and at 1004 a portion of an image that includes an object is received. At 1006, through use of a first DNN, a first word that represents a value of a first attribute is output. For example, the attribute can be "color", and the value of the attribute can be a value for the color of the object included in the portion of the image.

At 1008, through use of a second DNN, a second word is output that represents a value of a second attribute of the object. For instance, the second attribute can be gender, age, etc. At 1010, through use of a third DNN, a third word is output that represents a type of the object. At 1012, the first word, the second word, and the third word are placed in a sequence that is semantically correct. Thus, the first word can be placed first in the sequence, the second word can be placed second in the sequence, and the third word can be placed third in the sequence. At 1014, the sequence is transmitted to a search system, wherein the search system is configured to identify a supplemental content item that is related to the object. The methodology 1000 completes at 1016.

Figure 11:
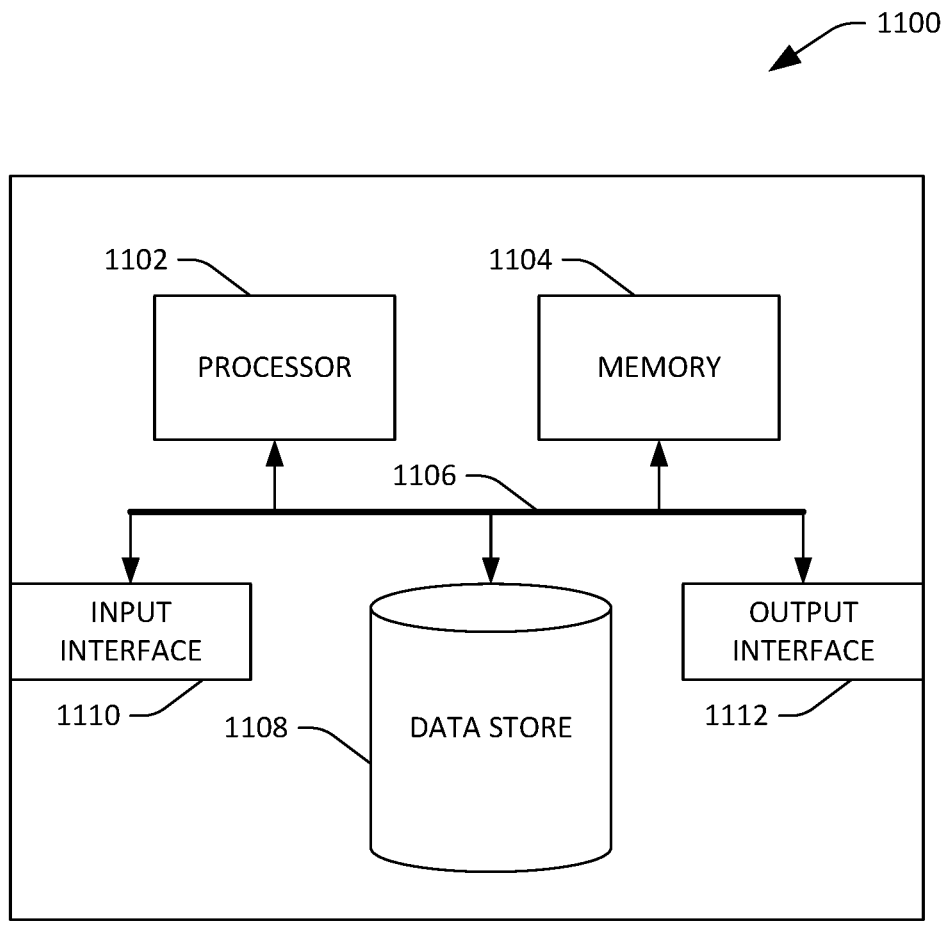
FIG. 11 is an exemplary computing system.

Referring now to FIG. 11, a high-level illustration of an exemplary computing device 1100 that can be used in accordance with the systems and methodologies disclosed herein is illustrated. For instance, the computing device 1100 may be used in a system that is configured to generate text that is descriptive of an object captured in an image. By way of another example, the computing device 1100 can be used in a system that is configured to search for supplemental content items based upon text that is descriptive of an object captured in an image. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store supplemental content items, images, webpages, etc.

The computing device 1100 additionally includes a data store 1108 that is accessible by the processor 1102 by way of the system bus 1106. The data store 1108 may include executable instructions, images, etc. The computing device 1100 also includes an input interface 1110 that allows external devices to communicate with the computing device 1100. For instance, the input interface 1110 may be used to receive instructions from an external computer device, from a user, etc. The computing device 1100 also includes an output interface 1112 that interfaces the computing device 1100 with one or more external devices. For example, the computing device 1100 may display text, images, etc. by way of the output interface 1112.

It is contemplated that the external devices that communicate with the computing device 1100 via the input interface 1110 and the output interface 1112 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1100 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1100 may be a distributed system. Thus, for instance, several devices may be in communication by way of a network connection and may collectively perform tasks described as being performed by the computing device 1100.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method executed by a processor of a computing system, the method comprising:
    in response to receipt of an indication that a client computing device has loaded an electronic page with an image therein:
        providing the image to a deep neural network (DNN) that is configured to identify types of objects in images;
        identifying, through use of the DNN, that a portion of the image comprises an object of a type from amongst a plurality of predefined types;
        upon the portion of the image being identified by the DNN, providing the portion of the image to a second DNN, wherein the second DNN is configured to identify values for a first attribute upon receipt of portions of images that include objects of numerous types, and further wherein the second DNN outputs a value for the first attribute of the object based upon the portion of the image provided to the second DNN;
        subsequent to identifying that the portion of the image comprises the object of the type, generating text that is descriptive of the object, wherein the text comprises a first word that identifies the value for the first attribute of the object and a second word that identifies a value of a second attribute of the object;
        transmitting the text to a search system responsive to generating the text, wherein the search system identifies a supplemental content item that is related to the object based upon the text, and further wherein a graphical indicator is caused to be presented on the page at the client computing device to indicate that the supplemental content item that is related to the object has been identified.

2. The method of claim 1, wherein the electronic page is a web page loaded by a web browser executing on the client computing device.

3. The method of claim 1, wherein generating the text further comprises:
    providing the portion of the image to a third DNN, wherein the third DNN is configured to identify values for the second attribute upon receipt of portions of images that include the objects of the numerous types; and
    generating, through use of the third DNN, the second word that identifies the value of the second attribute of the object.

4. The method of claim 3, wherein generating the text further comprises:
    providing the portion of the image to a fourth DNN, wherein the fourth DNN is configured to identify types of the objects upon receipt of portions of images that include the objects of the numerous types; and
    generating, through use of the fourth DNN, a third word that identifies the type of the object, wherein the generated text additionally includes the third word.

5. The method of claim 4, wherein generating the text further comprises:
    arranging the first word, the second word, and the third word in a sequence, wherein the first word is first in the sequence, the second word is second in the sequence, and the third word is third in the sequence.

6. The method of claim 1, wherein the supplemental content item is caused to be presented on the electronic page with the image responsive to the search system identifying the supplemental content item.

7. The method of claim 1, wherein the first attribute is color and the second attribute is gender that is associated with the object.

8. The method of claim 1, wherein the first attribute is color and the second attribute is age that is associated with the object.

9. A computing system comprising:
    a processor; and memory storing instructions that, when executed by the processor, cause the processor to perform acts comprising:

receiving an image, wherein the image is on a page that is being displayed on a client computing device that is in network communication with the computing system, and further wherein the image comprises an object;

extracting a portion of the image from the image, wherein the portion of the image includes the object;

providing the portion of the image to a first deep neural network (DNN), wherein the first DNN is configured to output words that represent values of a first attribute of objects upon receipt of portions of images that include the objects, wherein the first DNN outputs a first word in response to receipt of the portion of the image, and further wherein the first word represents a value of the first attribute of the object;

providing the portion of the image to a second DNN, wherein the second DNN is configured to output words that represent values of a second attribute of the objects upon receipt of the portions of the images that include the objects, wherein the second DNN outputs a second word in response to receipt of the portion of the image, and further wherein the second word represents a value of the second attribute of the object; and transmitting the first word and the second word to a search system, wherein the search system is configured to identify a supplemental content item based upon the first word and the second word, wherein the supplemental content item is related to the object in the image, and further wherein a graphical indicator is caused to be presented on the page at the client computing device to indicate that the supplemental content item that is related to the object has been identified.

10. The computing system of claim 4, wherein the first attribute is color and the second attribute is gender associated with the object.

11. The computing system of claim 9, wherein the first attribute is color and the second attribute is age associated with the object.

12. The computing system of claim 9, wherein the portion of the image is extracted by a third DNN, wherein the third DNN is configured to identify objects in images provided to the third DNN, and further wherein the third DNN is configured to define bounding boxes around the objects in the images provided to the third DNN.

13. The computing system of claim 9, the acts further comprising:

providing the portion of the image to a third DNN, wherein the third DNN is configured to output words that represent types of the objects upon receipt of the portions of the images that include the objects, wherein the third DNN outputs a third word in response to receipt of the portion of the image, wherein the third word represents type of the object in the image, and further wherein the third word is transmitted with the first word and the second word to the search system.

14. The computing system of claim 13, the acts further comprising:

arranging the first word, the second word, and the third word in a sequence prior to transmitting the first word, the second word, and the third word to the search system, wherein the first word is first in the sequence, the second word is second in the sequence, and the third word is third in the sequence.

15. The computing system of claim 9, wherein the object is an article of clothing worn by a person in the image.

16. A computer-readable storage medium comprising instructions that, when executed by a processor, cause the processor to perform acts comprising:

in response to receipt of an indication that a client computing device has loaded an electronic page with an image therein, providing the image to a deep neural network (DNN) that is configured to identify types of objects in images;

identifying, through use of the DNN, that a portion of the image comprises an object of a type from amongst a plurality of predefined types;

providing the portion of the image to a second DNN, wherein the second DNN is configured to identify values for a first attribute upon receipt of portions of images that include objects of numerous types, and further wherein the second DNN outputs a value for the first attribute of the object;

subsequent to identifying that the portion of the image comprises the object of the type and further subsequent to the second DNN outputting the value for the first attribute, generating text that is descriptive of the object, wherein the text comprises a first word that identifies the value for the first attribute of the object and a second word that identifies a value of a second attribute of the object, wherein a supplemental content item that is related to the object is identified based upon the generated text; and transmitting the first word and the second word to a search system, wherein the search system is configured to identify a supplemental content item based upon a query that comprises the first word and the second word, wherein the supplemental content item is related to the object in the image, and further wherein a graphical indicator is caused to be presented on the electronic page at the client computing device to indicate that the supplemental content item that is related to the object has been identified by the search system.

17. The computer-readable storage medium of claim 16, wherein generating the text further comprises:

providing the portion of the image to a third DNN, wherein the third DNN is configured to identify values for the second attribute upon receipt of portions of images that include the objects of the numerous types; and generating, through use of the third DNN, the second word that identifies the value of the second attribute of the object.

18. The computer-readable storage medium of claim 17, wherein generating the text further comprises:

providing the portion of the image to a fourth DNN, wherein the fourth DNN is configured to identify types of the objects upon receipt of portions of images that include the objects of the numerous types; and generating, through use of the fourth DNN, a third word that identifies the type of the object, wherein the third word is transmitted to the search system with the first word and the second word.

19. The computer-readable storage medium of claim 18, the acts further comprising:

prior to transmitting the first word, the second word, and the third word to the search system, placing the first word, the second word, and the third word in a predefined sequence.

20. The computer-readable storage medium of claim 16, wherein the graphical indicator is a link that, when selected, causes a web browser executing on the client computing device to load a web page where the object having the value of the first attribute and the value for the second attribute is presented for purchase.

* * * * *